(12) United States Patent
Sørensen (10) Patent No.: US 11,913,432 B1
(45) Date of Patent: Feb. 27, 2024

(54) METHOD FOR DISMANTLING A WIND TURBINE GEARBOX FROM A MAIN SHAFT AND USE OF THE METHOD (71) Applicant: Diesel ApS, Grenaa (DK)

(72) Inventor: Ebbe Karsten Sørensen, Grenaa (DK)

(73) Assignee: Diesel APS, Grenaa (DK)

(*) Notice: Subject to any disclaimer, the term of this patent is extended or adjusted under 35 U.S.C. 154(b) by 0 days.

(21) Appl. No.: 18/265,180

(22) PCT Filed: Dec. 17, 2020

(86) PCT No.: PCT/DK2020/050374
§ 371 (c)(1),
(2) Date: Jun. 2, 2023

(87) PCT Pub. No.: WO2022/128027
PCT Pub. Date: Jun. 23, 2022

(51) Int. Cl.
B23P 11/00 (2006.01)
F03D 80/00 (2016.01)
(Continued)

(52) U.S. Cl.
CPC ............ *F03D 80/011* (2023.08); *B23P 19/04* (2013.01); *F03D 80/504* (2023.08); *F05B 2230/70* (2013.01); *F05B 2230/80* (2013.01)

(58) Field of Classification Search
CPC ...... F03D 80/011; F03D 80/504; B23P 19/04; B23P 11/00; F05B 2230/70; F05B 2230/80
See application file for complete search history.

(56) References Cited

U.S. PATENT DOCUMENTS

2011/0072627 A1* 3/2011 Ohl, Jr. ................... F03D 15/00
29/239
2012/0131786 A1* 5/2012 Neumann ............... F03D 15/10
29/464
2018/0238308 A1* 8/2018 Signore .................. F03D 15/00

FOREIGN PATENT DOCUMENTS

EP 2301710 A2 3/2011
EP 2573036 A2 3/2013
EP 2594783 A2 5/2013

OTHER PUBLICATIONS

Extending the Bearing Life Cycle SKF Maintenance, 4 pgs, Jul. 1, 2017.

(Continued)

*Primary Examiner* — Jun S Yoo
(74) *Attorney, Agent, or Firm* — Blank Rome LLP (57) ABSTRACT Disclosed is a method for dismantling a wind turbine gearbox (15) from a main shaft (7) in the nacelle (3) of a wind turbine (1), wherein a first end (11) of the main shaft (7) is connected to the gearbox (15) in a connection cavity (22) of the gearbox (15) and a second end (12) of the main shaft (7) is connected to a rotor (4) of the wind turbine (1). The method comprises the steps of: —arranging a hydraulic connection plug (13) in a centre channel (14) of a second end (37) of a gearbox shaft (21) of the gearbox (15), wherein a first end (20) of the gearbox shaft (21) is arranged at the connection cavity (22) on a first side (23) of the gearbox (15) and wherein the second end (37) of the gearbox shaft (21) is arranged at a second side (24) of the gearbox (15) opposite the first side (23), —securing the hydraulic connection plug (13) and the gearbox shaft (21) against axial displacement in a direction towards the second side (24) of the gearbox (15), —connecting a hydraulic pump (25) to the hydraulic connection plug (13), and —pumping liquid into the connection cavity (22) by means of the hydraulic pump (25) to force the (Continued)

main shaft (7) out of the connection cavity (22). Furthermore, use of the method is disclosed.

19 Claims, 5 Drawing Sheets

(51) Int. Cl.
    *B23P 19/04*     (2006.01)
    *F03D 80/50*     (2016.01)

(56)     References Cited

OTHER PUBLICATIONS

Written Opinion for PCT/DK2020/050374, dated Sep. 9, 2021, 5 pgs.

\* cited by examiner

METHOD FOR DISMANTLING A WIND TURBINE GEARBOX FROM A MAIN SHAFT AND USE OF THE METHOD

RELATED APPLICATION

This application is a national phase of PCT/DK2020/050374, filed on Dec. 17, 2020. The entire contents of this application is hereby incorporated by reference.

FIELD OF THE INVENTION

The invention relates to a method for dismantling a wind turbine gearbox from a main shaft in the nacelle of a wind turbine, wherein a first end of the main shaft is connected to the gearbox in a connection cavity of the gearbox and a second end of the main shaft is connected to a rotor of the wind turbine. Furthermore, invention relates to use of the method.

BACKGROUND OF THE INVENTION

As wind turbines over the latest decades have become increasingly bigger both in output and in size the problems in relation to maintenance and repair—particularly in the nacelle of the wind turbine—have also become bigger.

In many modern wind turbines, the wind turbine rotor is connected to a gearbox through a main shaft. The gearbox is then in turn connected to the generator. One of the problems is when the gearbox has to be dismantled from the main shaft e.g. in case of maintenance, repair, or replacement. This has to take place in the nacelle, but the main shaft and gearbox of modern wind turbines are very big and the connection between the main shaft and the gearbox have to be very strong to be able to transfer the massive torque from the rotor. This obviously makes it difficult to dismantle the main shaft from the gearbox.

It is therefore known to dismantle the main shaft from the gearbox of a wind turbine by means of jacking devices but such systems are complex and expensive.

An object of the invention is therefore to provide for an advantageous technique for dismantling a wind turbine gearbox from a main shaft in the nacelle of a wind turbine.

The Invention

The invention provides for a method for dismantling a wind turbine gearbox from a main shaft in the nacelle of a wind turbine, wherein a first end of the main shaft is connected to the gearbox in a connection cavity of the gearbox and a second end of the main shaft is connected to a rotor of the wind turbine. The method comprises the steps of:

- arranging a hydraulic connection plug in a centre channel of a second end of a gearbox shaft of the gearbox, wherein a first end of the gearbox shaft is arranged at the connection cavity on a first side of the gearbox and wherein the second end of the gearbox shaft is arranged at a second side of the gearbox opposite the first side,
- securing the hydraulic connection plug and the gearbox shaft against axial displacement in a direction towards the second side of the gearbox,
- connecting a hydraulic pump to the hydraulic connection plug, and
- pumping liquid into the connection cavity by means of the hydraulic pump to force the main shaft out of the connection cavity.

Forcing the wind turbine gearbox and the main shaft apart by means of a pressurized liquid is advantageous in that a massive separation force hereby can be generated in a simple and inexpensive way. However, the central gearbox shaft is not designed to withstand the axial forces it is subject to by the hydraulic pressure generated by the pump and it is therefore advantageous to secure the gearbox shaft against axial displacement in a direction towards the second side of the gearbox to prevent damage to the gearbox. And since the hydraulic connection plug also has to be locked in place during the dismantling process to prevent leakage it is advantageous to also secure the hydraulic connection plug against axial displacement in a direction towards the second side of the gearbox.

Furthermore, the liquid being pumped into the connection cavity may lubricate the connection between the wind turbine gearbox and the main shaft in the connection cavity to thereby reduce friction and thereby aid in the dismantling process.

It should be noted that in this context the term "connection cavity" includes any kind of opening, space or hole in at least a part of the gearbox in which the main shaft extends into and through which the torque generated by the rotor is transferred from the main shaft to the gearbox typically through a radial friction connection, a radial spline connection, other interlocking geometry or other or any combination thereof.

In an aspect, the pressure of the liquid being pumped into the connection cavity is gradually increased.

It is advantageous to gradually increase the pressure of the liquid being pumped into the connection cavity in that this ensures a more controlled dismantling and prevents the main shaft from being forcefully shot out of the connection cavity.

In an aspect, the pressure is gradually increased until displacement between the gear box and the main shaft is detected.

Stopping increasing the liquid pressure when displacement between the gear box and the main shaft is detected is advantageous in that a more controlled dismantling is hereby achieved.

In an aspect, the method further includes arranging a liquid collection container under the connection cavity.

Once the main shaft is fully free of the connection cavity the pumped in liquid will run out of the connection cavity and it is therefore advantageous to place a liquid collection container under the connection cavity to collect the liquid.

In an aspect, the method further includes plugging a hollow centre hole of the main shaft at the second end of the main shaft by means of a blind plug before pumping liquid into the connection cavity.

If the main shaft is tube shaped—i.e. it comprises a hollow centre—the pumped in liquid could escape through this hole and it is therefore advantageous to plug this hole before pumping liquid into the cavity. And since the hole in the end of the main shaft engaging the connection cavity is inaccessible before disconnecting the main shaft from the gear box, it is advantageous to plug the hole through the main shaft in the end facing the rotor.

In an aspect, the method further includes removing cables, wires and/or tubes from the hollow centre of the main shaft before plugging the hollow centre hole of the main shaft.

Cables, wires and/or tubes are often guided through the centre hole of the main shaft from the rotating rotor to the stationary part of the nacelle and to prevent damaging these cables, wires and/or tubes it is advantageous to remove them before plugging the hollow centre hole of the main shaft.

In an aspect, the method further includes removing any mechanical fixture locking the main shaft to the gearbox before pumping liquid into the connection cavity.

If the main shaft is further connected to the gearbox through a mechanical fixture it is advantageous to remove or release this fixture before pumping liquid into the connection cavity to reduce the forces needed to dismantle the main shaft from the gearbox.

It should be noted that in this context the term "mechanical fixture" includes any kind of clamp coupling, locking pins, bolt connection or other or any combination thereof suited for securing, improving or locking the connection between the main shaft and the gearbox.

In an aspect, the method further includes securing the hydraulic connection plug and the gearbox shaft against axial displacement by means of a blocking device.

Securing the hydraulic connection plug and the gearbox shaft against axial displacement by means of a physical blocking device is advantageous in that this blocking device can be better designed to withstand the forces and maintain the hydraulic connection plug and the gearbox shaft substantially in their original position in relation to the rest of the gearbox.

In an aspect, the blocking device is rigidly connected to a housing of the gearbox.

Displacement between the gearbox shaft and the rest of the gearbox can be damaging to the gearbox and by rigidly connecting the blocking device to a housing of the gearbox any such mutual displacement can be avoided. And at the same time the hydraulic connection plug is maintained securely in the centre channel of the second end of the gearbox shaft.

In an aspect, the blocking device is formed by means of a blocking member pressing against the hydraulic connection plug in an axial direction towards the first side of the gearbox.

Forming the blocking device by means of a blocking member pressing against the hydraulic connection plug is advantageous in that the hydraulic connection plug is thereby maintained in place in the gearbox shaft while at the same time blocking movement in the axial direction towards the second side of the gearbox.

In an aspect, the blocking member is rigidly connected to a housing of the gearbox by means of at least two connection members located on opposite sides of the hydraulic connection plug.

Securing the hydraulic connection plug and the gearbox shaft against axial displacement by means of a blocking member rigidly connected to the housing of the gearbox by means of at least two connection members located on opposite sides of the hydraulic connection plug is advantageous in that the blocking member is hereby firmly secured and the load is better distributed.

In an aspect, the method further includes disconnecting the gearbox from the nacelle before pumping liquid into the connection cavity.

Disconnecting the gearbox from the nacelle before pumping liquid into the connection cavity is advantageous in that this will better allow the gearbox to be displaced when liquid is pumped into the connection cavity and the main shaft and the gearbox are driven apart.

In an aspect, the method further includes lifting the gearbox before pumping liquid into the connection cavity.

Lifting the gearbox at least slightly before pumping liquid into the connection cavity is advantageous in that this will better allow the gearbox to be displaced when liquid is pumped into the connection cavity and the main shaft and the gearbox are driven apart.

In an aspect, the method further includes locking the main shaft against vertical displacement before pumping liquid into the connection cavity.

When main shaft is mounted in the gearbox the main shaft is locked against vertical displacement by the gearbox. However, once the main shaft is free of the connection cavity the weight of the rotor may tilt the main shaft which could possibly damage the main bearing or other. It is therefore advantageous to lock the main shaft against vertical displacement before pumping liquid into the connection cavity.

In an aspect, the method further includes disconnecting the gearbox from a generator before pumping liquid into the connection cavity.

Disconnecting the gearbox from the generator before pumping liquid into the connection cavity is advantageous in that this will enable easier displacement of the gearbox.

In an aspect, the liquid is a lubricating liquid.

Pumping a lubricating liquid into the connection cavity is advantageous in that the lubricating effect of the liquid hereby may reduce friction and thereby aid in separating the main shaft and the gearbox.

It should be noted that in this context the term "lubricating liquid" includes any kind of oil, soap water, grease or other or any combination thereof suited for lubricating the connection between the main shaft and the gearbox.

In an aspect, the lubricating liquid is oil.

Using oil as a lubricating liquid is advantageous in that oil is durable, incompressible an have excellent lubrication qualities.

In an aspect, the main shaft is arranged to transfer torque from the rotor to the gearbox.

Hereby is achieved an advantageous embodiment of the invention.

The invention provides for use of a method according to any of the preceding claims for dismantling a wind turbine gearbox from a main shaft in the nacelle of a wind turbine having a nominal output of at least 1 Megawatt.

When wind turbines exceed a nominal output of 1 Megawatt the main shaft and gearbox becomes so big that puller solutions or jacking solutions become too big and unmanageable and it is therefore particularly advantageous to use the method according to the present invention in relation to wind turbines having a nominal output of at least 1 Megawatt.

FIGURES

An embodiment of the invention will be described, by way of non-limiting example, in the following with reference to the figures in which.

DETAILED DESCRIPTION

Figure 1:
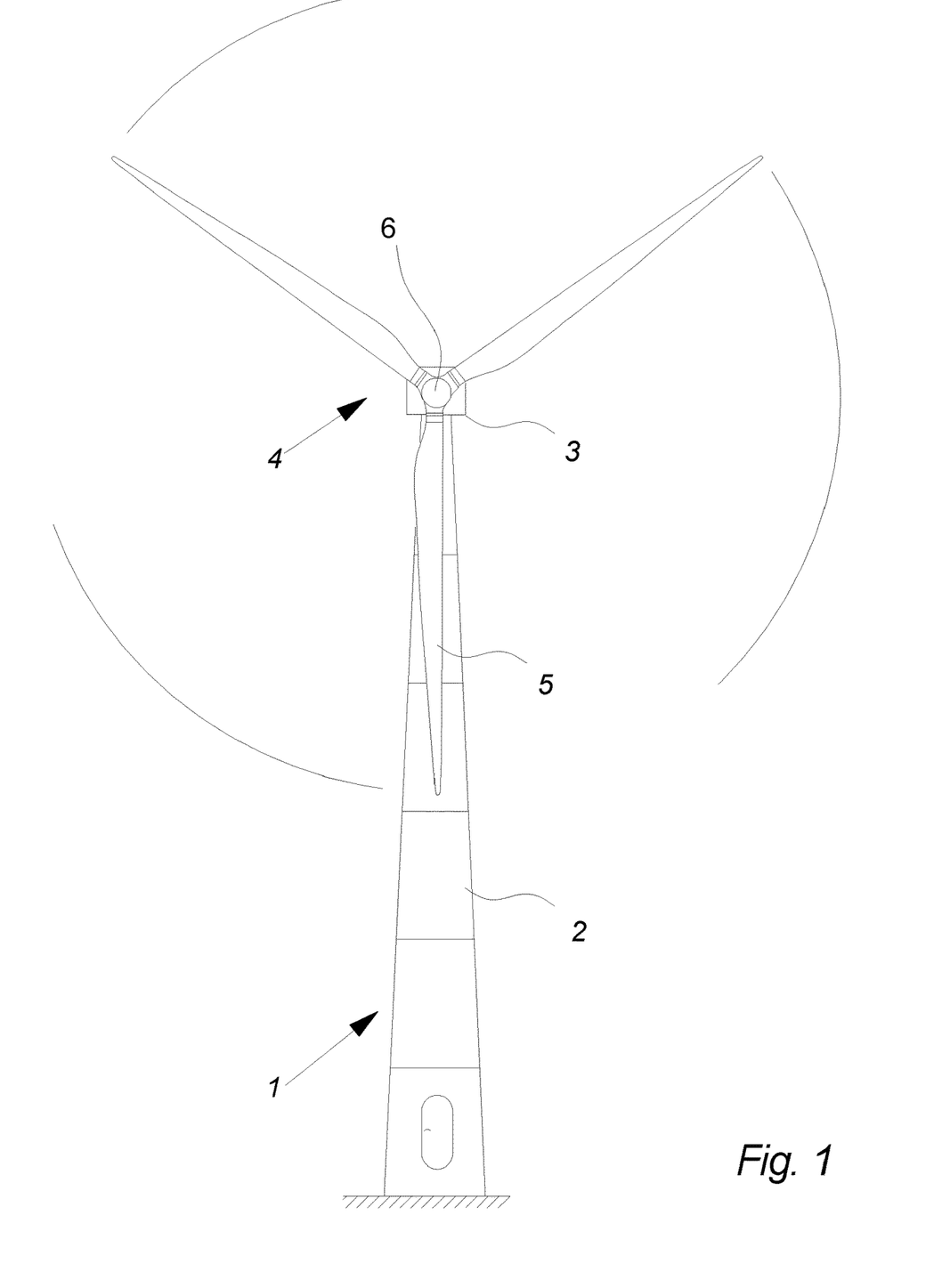
FIG. 1 illustrates a large modern wind turbine as known in the art.

FIG. 1 illustrates a large modern wind turbine 1 as known in the art, comprising a tower 2 and a wind turbine nacelle 3 positioned on top of the tower 2. The wind turbine rotor 4 comprises three wind turbine blades 5 mounted on a common hub 6 which is connected to the nacelle 3 through the main shaft extending out of the nacelle 3 front. In another embodiment the wind turbine rotor 4 could comprise another number of blades 5 such as one, two, four, five or more.

Figure 2:
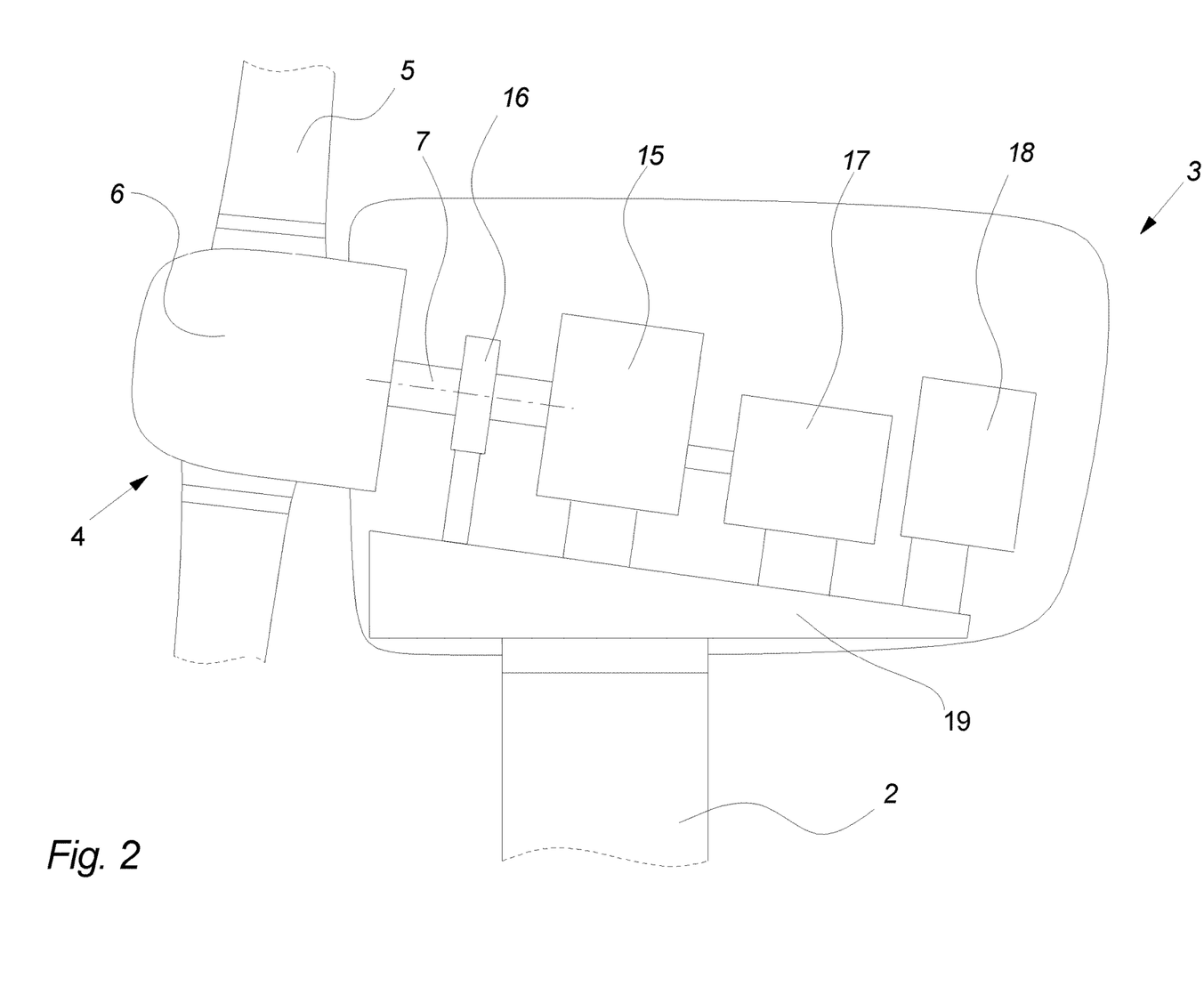
FIG. 2 illustrates a simplified cross section of a nacelle, as seen from the side.

FIG. 2 illustrates a simplified cross section of a nacelle 3 of a prior art wind turbine 1, as seen from the side. Nacelles 3 exists in a multitude of variations and configurations but in most cases the drive train in the nacelle 3 almost always comprise one or more of the following components: a gearbox 15, a coupling (not shown), main shaft 7, a main bearing 16 and a generator 17. A nacelle 3 of a modern wind turbine 1 can also include a converter 18 (also called an inverter) and additional peripheral equipment such as further power handling equipment, control cabinets, hydraulic systems, cooling systems and more. However, it is obvious to the skilled person that the drive train inside the nacelle 3 may be designed in a multitude of other ways.

The weight of the entire nacelle 3 including the nacelle components 15, 16, 17, 18 is carried by a nacelle structure 19. The components 15, 16, 17, 18 are usually placed on and/or connected to this common load carrying nacelle structure 19. In this simplified embodiment the load carrying nacelle structure 19 only extends along the bottom of the nacelle 3 e.g. in form of a bed frame to which some or all the components 15, 16, 17, 18 are connected. In another embodiment the load carrying structure 19 could comprise a gear bell which through the main bearing 14 could transfer the load of the rotor 4 to the tower 2, or the load carrying structure 19 could comprise several interconnected parts such as latticework.

Figure 3:
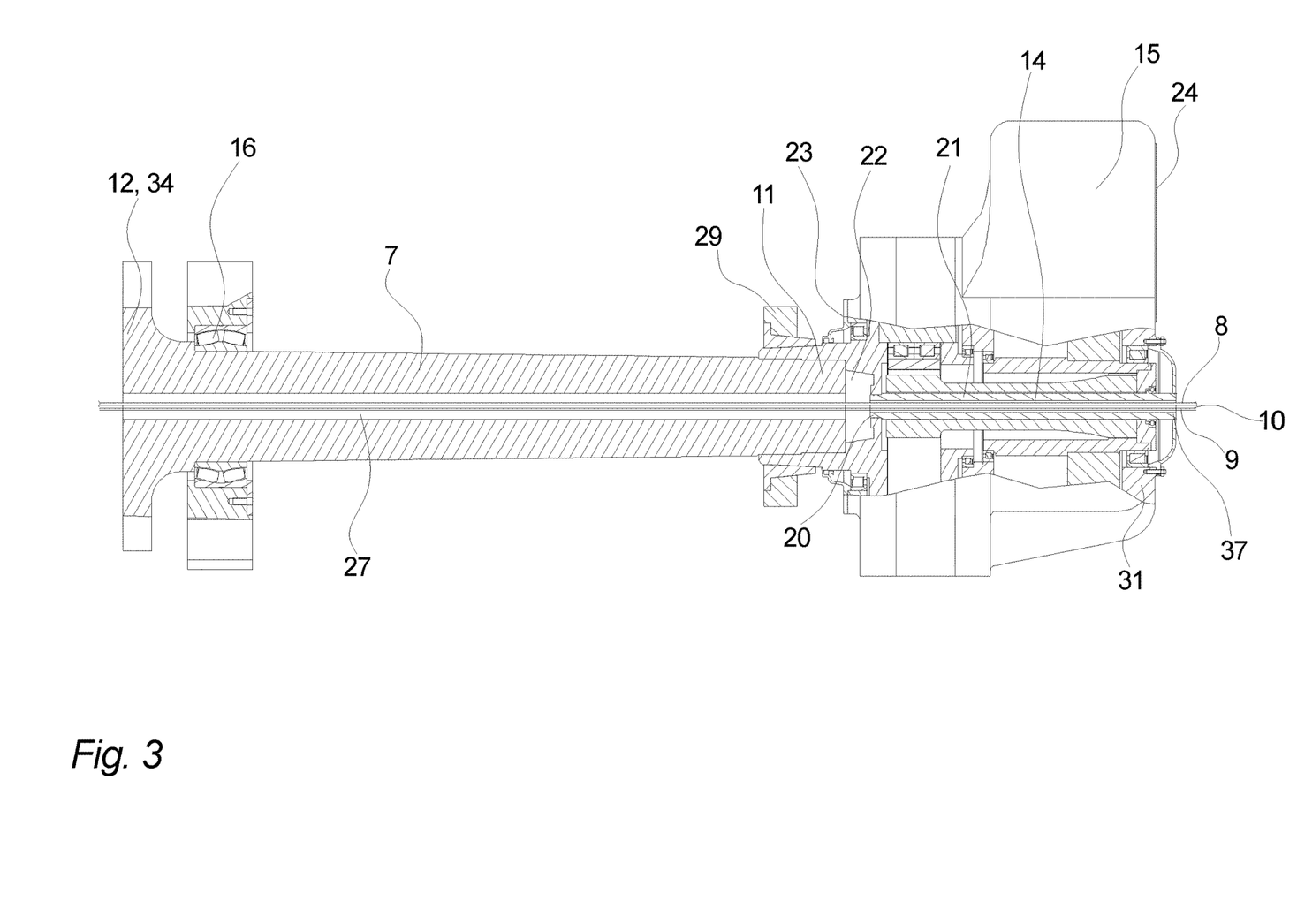
FIG. 3 illustrates a partial cross section of a gearbox and main shaft during normal use, as seen from the side.

FIG. 3 illustrates a partial cross section of a gearbox 15 and main shaft 7 during normal use, as seen from the side.

In this embodiment the main shaft 7 is hollow—i.e. it comprises a hollow centre hole 27 extending all the way through the shaft 7 to allow a hydraulic tube 8, power cables 9 and data cables 10 to extend from the rotating rotor 4 and into the nacelle 3 through the hollow centre hole 27 and further through a centre channel 14 of a gearbox shaft 21 of the gearbox 15 and further on to e.g. one or more rotating unions (not shown).

In this embodiment a second end 12 of the main shaft 7 comprises a flange 34 which is connected to the rotor (4—not shown in FIG. 3) of the wind turbine 1 and a first end 11 of the main shaft 7 is connected to the gearbox 15 in a connection cavity 22 of the gearbox 15.

In this embodiment the wind turbine 1 also comprises a mechanical fixture 29 in the form of a shrink disc arranged to compress an outer end of the connection cavity 22 around the main shaft 7 to further tighten the connection between the gearbox 15 and the main shaft 7. However, in another embodiment the mechanical fixture 29 could be formed by means of a clamp coupling, locking pins, bolts or other or in another embodiment the connection between the gearbox 15 and the main shaft 7 could be formed without a mechanical fixture 29 or at least without a mechanical fixture 29 that can be released e.g. in the form of interlocking geometry between the main shaft 7 and the gearbox 15—e.g. in the form of a spline connection—, by forming the main shaft 7 and the connection cavity 22 non-circular or other.

In this embodiment a main bearing 16 is arranged on the main shaft 7 to aid in rotatably carrying the load of the rotor 4. However, in another embodiment the main bearing could be located elsewhere, or it could be integrated in other equipment (such as the gearbox 15) or it could be formed by several bearings placed in different locations.

In this embodiment the connection cavity 22 is arranged on a first side 23 of the gearbox 15 and in this embodiment a first end 20 of the gearbox shaft 21 is arranged at the connection cavity 22 and extending to the second side 24 of the gearbox 15 at which the second end 37 of the gearbox shaft 21 is arranged.

Figure 4:
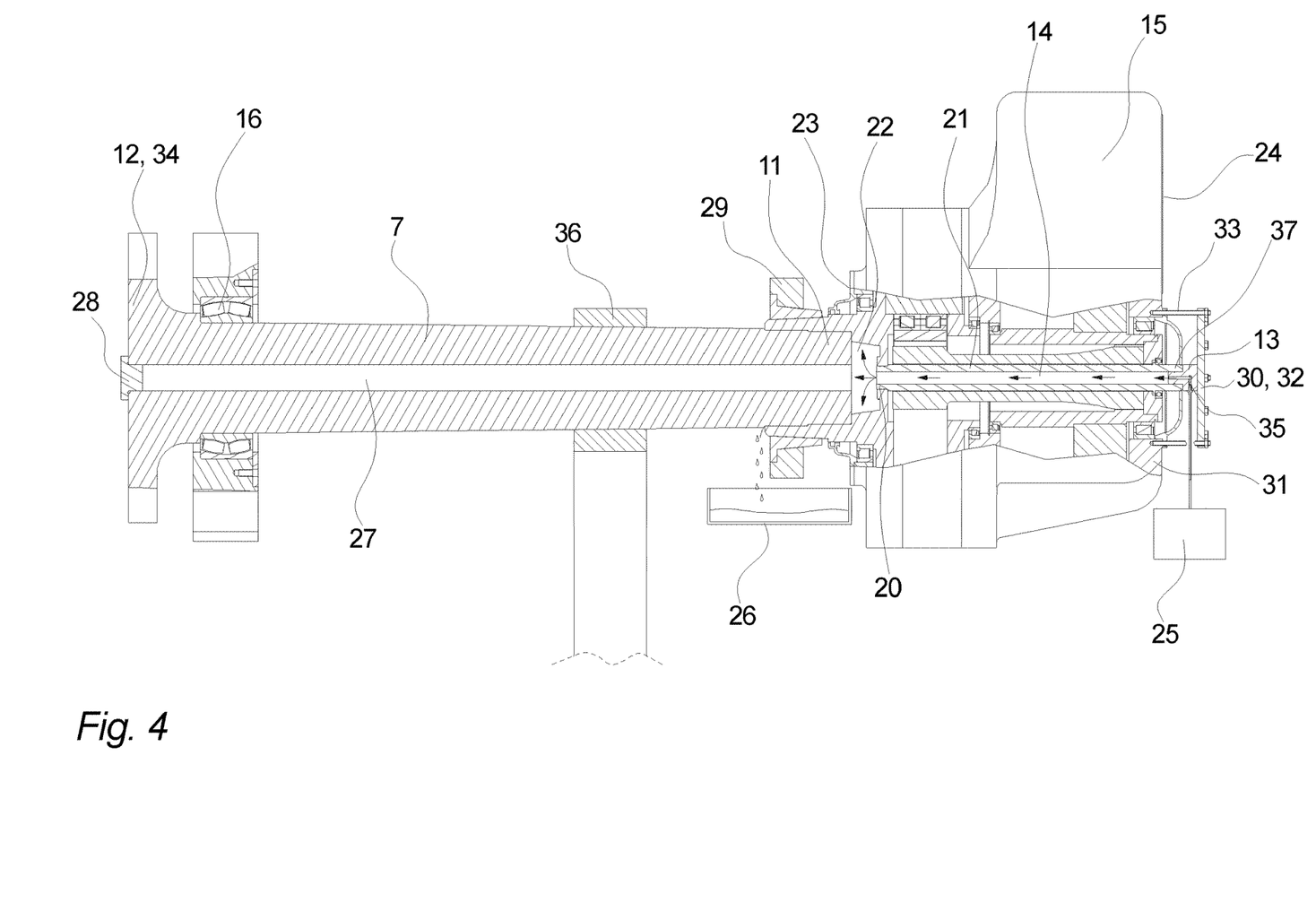
FIG. 4 illustrates a partial cross section of a gearbox and main shaft during dismantling, as seen from the side.

FIG. 4 illustrates a partial cross section of a gearbox 15 and main shaft 7 during dismantling, as seen from the side.

In this embodiment the hydraulic tube 8, power cables 9 and data cables 10 have first been removed by disconnecting them from the union (not shown) and pulling them out of the gearbox shaft 21 and the main shaft 7 and into the rotor 4. However, in another embodiment wire and tube connection between the rotor 4 and the nacelle 3 could be formed in another way and this step would therefore not be performed.

Since the main shaft 7 in this embodiment is hollow, a blind plug 28 is mounted in the hollow centre hole 27 of the main shaft 7 at the second end 12 of the main shaft 7 to prevent liquid from escaping when being pumped into the connection cavity 22. However, in another embodiment the main shaft 7 could be solid or the centre hole 27 does not extend all the way through the main shaft 7 and this step would therefore not be performed.

In this embodiment a hydraulic connection plug 13 is arranged in the centre channel 14 of the gearbox shaft 21 at the second end 37 of the gearbox shaft 21. The hydraulic connection plug 13 comprises an internal channel 35 through which liquid may pass into the centre channel 14 of the gearbox shaft 21, wherein the centre channel 14 extends all the way through the gearbox shaft 21.

Once the hydraulic connection plug 13 is in place, the hydraulic connection plug 13 and the gearbox shaft 21 is secured against axial displacement in the direction towards the second side 24 of the gearbox 15. In this embodiment the hydraulic connection plug 13 and the gearbox shaft 21 is secured against axial displacement by means of a blocking device 30 which in this embodiment comprises a blocking member 32 pressing against the hydraulic connection plug 13 in an axial direction towards the first side 23 of the gearbox 15, in that the blocking member 32 in this embodiment is rigidly connected to the housing 31 of the gearbox 15 by means of two connection members 33 located on opposite sides of the hydraulic connection plug 13. In this embodiment each of the connection members 33 are formed by a threaded rod being screwed into a threaded hole in the gearbox housing 31 and extending through a hole or slit in the blocking member 32. Once in place a nut is screwed onto the threaded rod and tightened so that the blocking member 32 presses against the hydraulic connection plug 13 and in turn the gearbox shaft 21 in an axial direction towards the first side 23 of the gearbox 15.

However, in another embodiment the blocking member 32 could be connected to or formed integrally with the hydraulic connection plug 13 and/or in another embodiment the blocking device 30 could comprise more than two connection members 33—such as three, four, six or more—or the connection members 33 could be formed as bolts, clamping devices, hooks or other connected to the housing 31 of the gearbox 15. Or in another embodiment the blocking device 30 would not be connected to the gearbox housing 31 but would instead be connected to the nacelle 3, the generator 17 or another nacelle component—particularly if the gearbox 15 is not displaced during the dismantling process. Or in another embodiment the hydraulic connection plug 13 and the gearbox shaft 21 is secured against axial displacement in a direction towards the second side 24 by means of one or more wedges being wedged in between e.g.

the connection plug 13 and a slit in the gearbox housing 31 or by means of one or more expanding elements being arranged to expand between e.g. the hydraulic connection plug 13 and an enclosing wall of the gearbox housing 31 to fix the position of the hydraulic connection plug 13. Many other ways of—and many other means for—securing the hydraulic connection plug 13 and the gearbox shaft 21 against axial displacement in the direction towards the second side 24 of the gearbox 15 are possible including any combination of the previously described.

A hydraulic pump 25 is in this embodiment connected to the internal channel 35 of the hydraulic connection plug 13 and a liquid is pumped into the connection cavity 22 by means of the hydraulic pump 25 via the internal channel 35 and the centre channel 14 of the gearbox shaft 21. In the connection cavity 22 the liquid will press against all surfaces in the connection cavity 22 and thereby force the gearbox 15 and the main shaft 7 apart. The liquid will also press against the first end 20 of the gearbox shaft 21 and force it in an axial direction towards the second side 24 of the gearbox 15. But by securing the hydraulic connection plug 13 and the gearbox shaft 21 against axial displacement in the direction towards the second side 24 of the gearbox 15—in this case by means of the blocking device 30—the axial position of the gearbox shaft 21 is fixed and damage to the gearbox shaft 21 or other parts of the gearbox 15 is hereby avoided.

In this embodiment the liquid is hydraulic oil but in another embodiment the liquid could be water, liquid soap, grease or other.

In this embodiment the gearbox 15 is disconnected from the nacelle 3 before liquid is pumped into the connection cavity 22 and the gearbox 15 is lifted slightly by means of an external crane (not shown) so that the gearbox 15 is displaced during the dismantling process while the main shaft 7 remains in its place. However, in another embodiment the gearbox 15 could remain fixed while the main shaft 7 is displaced during the dismantling process or the gearbox 15 could be lifted by means of an internal overhead crane or by another lifting method.

As explained the gearbox 15 is displaced during the dismantling process in this embodiment and to secure the main shaft 7 against being tilted by the weight of the rotor 4 once free of the connection cavity 22, the method does in this embodiment include locking the main shaft 7 against vertical displacement before pumping liquid into said connection cavity 22. In this embodiment this is done by means of a bracing device 36 extending around the main shaft 7 and being connected to the nacelle structure 19. However, in another embodiment the main shaft 7 could be locked against vertical displacement by means of clamps, counterweights, a dedicated fixture or other or a bracing device 36 would not be necessary e.g. if the main shaft 7 was fixed by more than one main bearing 16.

In this embodiment a liquid collection container 27 is placed under to connection cavity 22 to collect any liquid leaking from the connection cavity 22 during and particularly after the dismantling process.

In this embodiment the pressure of the liquid being pumped into the connection cavity 22 is gradually increased by means of the hydraulic pump 25 until displacement between the gearbox 15 and the main shaft 7 is detected. Once displacement between the gearbox 15 and the main shaft 7 is detected the liquid pressure is maintained constant as long as displacement is detected. If the displacement stops again before the main shaft 7 is fully separated from the connection cavity 22 the pressure can be increased again.

In this embodiment the gearbox shaft 21 is the main centre shaft extending all the way through the gearbox 15 but in another embodiment the gearbox shaft 21 could be a shaft of a planetary gear, or a shaft of displaced gear or another shaft of the gearbox 15.

Figure 5:
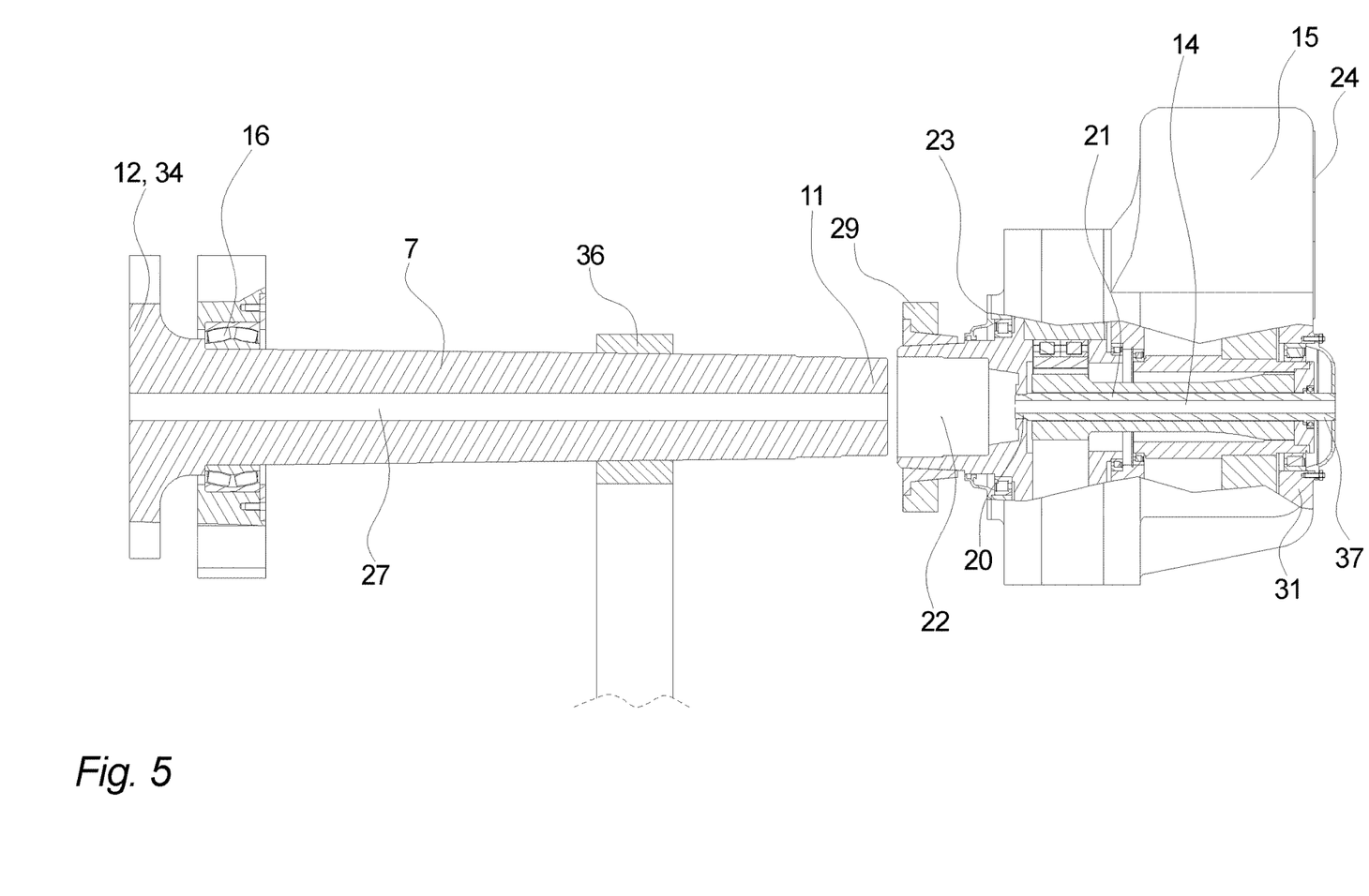
FIG. 5 illustrates a partial cross section of a gearbox and main shaft after dismantling, as seen from the side.

FIG. 5 illustrates a partial cross section of a gearbox 15 and main shaft 7 after dismantling, as seen from the side.

Once the main shaft 7 is fully separated from the connection cavity 22, the pump 25 is stopped and the blocking device 30, the blind plug 28 and the hydraulic connection plug 13 are removed again.

The invention has been exemplified above with reference to specific examples of wind turbines 1, main shafts 7, gearboxes 15 and other. However, it should be understood that the invention is not limited to the particular examples described above but may be designed and altered in a multitude of varieties within the scope of the invention as specified in the claims.

LIST

1. Wind turbine
2. Tower
3. Nacelle
4. Rotor
5. Blade
6. Hub
7. Main shaft
8. Hydraulic tube
9. Power cable
10. Data cable
11. First end of main shaft
12. Second end of main shaft
13. Hydraulic connection plug
14. Centre channel
15. Gearbox
16. Main bearing
17. Generator
18. Converter
19. Nacelle structure
20. First end of Gearbox shaft
21. Gearbox shaft
22. Connection cavity
23. First side of gearbox
24. Second side of gearbox
25. Hydraulic pump
26. Liquid collection container
27. Hollow centre hole of main shaft
28. Blind plug
29. Mechanical fixture
30. Blocking device
31. Housing of gearbox
32. Blocking member
33. Connection members
34. Flange
35. Internal channel
36. Bracing device
37. Second end of gearbox shaft

The invention claimed is:

1. A method for dismantling a wind turbine gearbox from a main shaft in the nacelle of a wind turbine, wherein a first end of said main shaft is connected to said gearbox in a connection cavity of said gearbox and a second end of said main shaft is connected to a rotor of said wind turbine, wherein said method comprises the steps of:

arranging a hydraulic connection plug in a centre channel of a second end of a gearbox shaft of said gearbox, wherein a first end of said gearbox shaft is arranged at said connection cavity on a first side of said gearbox and wherein said second end of said gearbox shaft is arranged at a second side of said gearbox opposite said first side, securing said hydraulic connection plug and said gearbox shaft against axial displacement in a direction towards said second side of said gearbox, connecting a hydraulic pump to said hydraulic connection plug, and pumping liquid into said connection cavity by means of said hydraulic pump to force said main shaft out of said connection cavity.

2. The method according to claim 1, wherein the pressure of said liquid being pumped into said connection cavity is gradually increased.

3. The method according to claim 2, wherein said pressure is gradually increased until displacement between said gearbox and said main shaft is detected.

4. The method according to claim 1, wherein said method further includes arranging a liquid collection container under said connection cavity.

5. The method according to claim 1, wherein said method further includes plugging a hollow centre hole of said main shaft at said second end of said main shaft by means of a blind plug before pumping liquid into said connection cavity.

6. The method according to claim 5, wherein said method further includes removing cables, wires and/or tubes from said hollow centre of said main shaft before plugging said hollow centre hole of said main shaft.

7. The method according to claim 1, wherein said method further includes removing any mechanical fixture locking said main shaft to said gearbox before pumping liquid into said connection cavity.

8. The method according to claim 1, wherein said method further includes securing said hydraulic connection plug and said gearbox shaft against axial displacement by means of a blocking device.

9. The method according to claim 8, wherein said blocking device is rigidly connected to a housing of said gearbox.

10. The method according to claim 8, wherein said blocking device is formed by means of a blocking member pressing against said hydraulic connection plug in an axial direction towards said first side of said gearbox.

11. The method according to claim 10, wherein said blocking member is rigidly connected to a housing of said gearbox by means of at least two connection members located on opposite sides of said hydraulic connection plug.

12. The method according to claim 1, wherein said method further includes disconnecting said gearbox from said nacelle before pumping liquid into said connection cavity.

13. The method according to claim 1, wherein said method further includes lifting said gearbox before pumping liquid into said connection cavity.

14. The method according to claim 1, wherein said method further includes locking said main shaft against vertical displacement before pumping liquid into said connection cavity.

15. The method according to claim 1, wherein said method further includes disconnecting said gearbox from a generator before pumping liquid into said connection cavity.

16. The method according to claim 1, wherein said liquid is a lubricating liquid.

17. The method according to claim 16, wherein said lubricating liquid is oil.

18. The method according to claim 1, wherein said main shaft is arranged to transfer torque from said rotor to said gearbox.

19. Use of the method according to claim 1 for dismantling a wind turbine gearbox from a main shaft in the nacelle of a wind turbine having a nominal output of at least 1 Megawatt.

* * * * *